(12) United States Patent
Hammad

(10) Patent No.: US 7,730,829 B2
(45) Date of Patent: Jun. 8, 2010

(54) BEVERAGE BREWER

(75) Inventor: Jamal F. Hammad, Parkland, FL (US)

(73) Assignee: Sunbeam Products, Inc., Boca Raton, FL (US)

( * ) Notice: Subject to any disclaimer, the term of this patent is extended or adjusted under 35 U.S.C. 154(b) by 1414 days.

(21) Appl. No.: 11/136,961

(22) Filed: May 25, 2005

(65) Prior Publication Data

US 2006/0266222 A1    Nov. 30, 2006

(51) Int. Cl.
*A47J 31/00* (2006.01)

(52) U.S. Cl. .................................. 99/295; 99/302 R

(58) Field of Classification Search ............... 99/295, 99/302 R, 289 T, 287
See application file for complete search history.

(56) References Cited

U.S. PATENT DOCUMENTS

| | | | |
|---|---|---|---|
| 1,837,252 A | 12/1931 | Carter | |
| 2,451,195 A | 10/1948 | Brown | |
| 3,356,011 A | 12/1967 | Parraga | |
| 3,975,996 A * | 8/1976 | Vitous | 99/295 |
| 4,253,385 A | 3/1981 | Illy | |
| 4,254,694 A * | 3/1981 | Illy | 99/295 |
| 4,715,270 A * | 12/1987 | Harada | 99/289 R |
| 5,012,629 A | 5/1991 | Rehman | |
| 5,036,756 A * | 8/1991 | Lindee | 99/450.4 |
| 5,134,924 A | 8/1992 | Vicker | |
| 5,638,741 A * | 6/1997 | Cisaria | 99/295 |
| 5,755,149 A * | 5/1998 | Blanc et al. | 99/289 T |
| 5,826,492 A * | 10/1998 | Fond et al. | 99/295 |
| 5,921,168 A * | 7/1999 | Nello | 99/295 |
| 6,345,570 B1 * | 2/2002 | Santi | 99/289 R |
| 7,210,401 B1 * | 5/2007 | Rolfes et al. | 99/289 R |
| 2004/0055473 A1* | 3/2004 | Stoner | 99/295 |
| 2006/0102008 A1* | 5/2006 | Lin | 99/279 |

* cited by examiner

*Primary Examiner*—Reginald L Alexander
(74) *Attorney, Agent, or Firm*—Seth M. Blum

(57) ABSTRACT

A beverage brewer and method of using the same is provided. The beverage brewer has the capacity to brew a beverage from variable amounts of prepackaged pods or from free-form brewing material captured between upper and lower filter membrane surfaces.

15 Claims, 4 Drawing Sheets

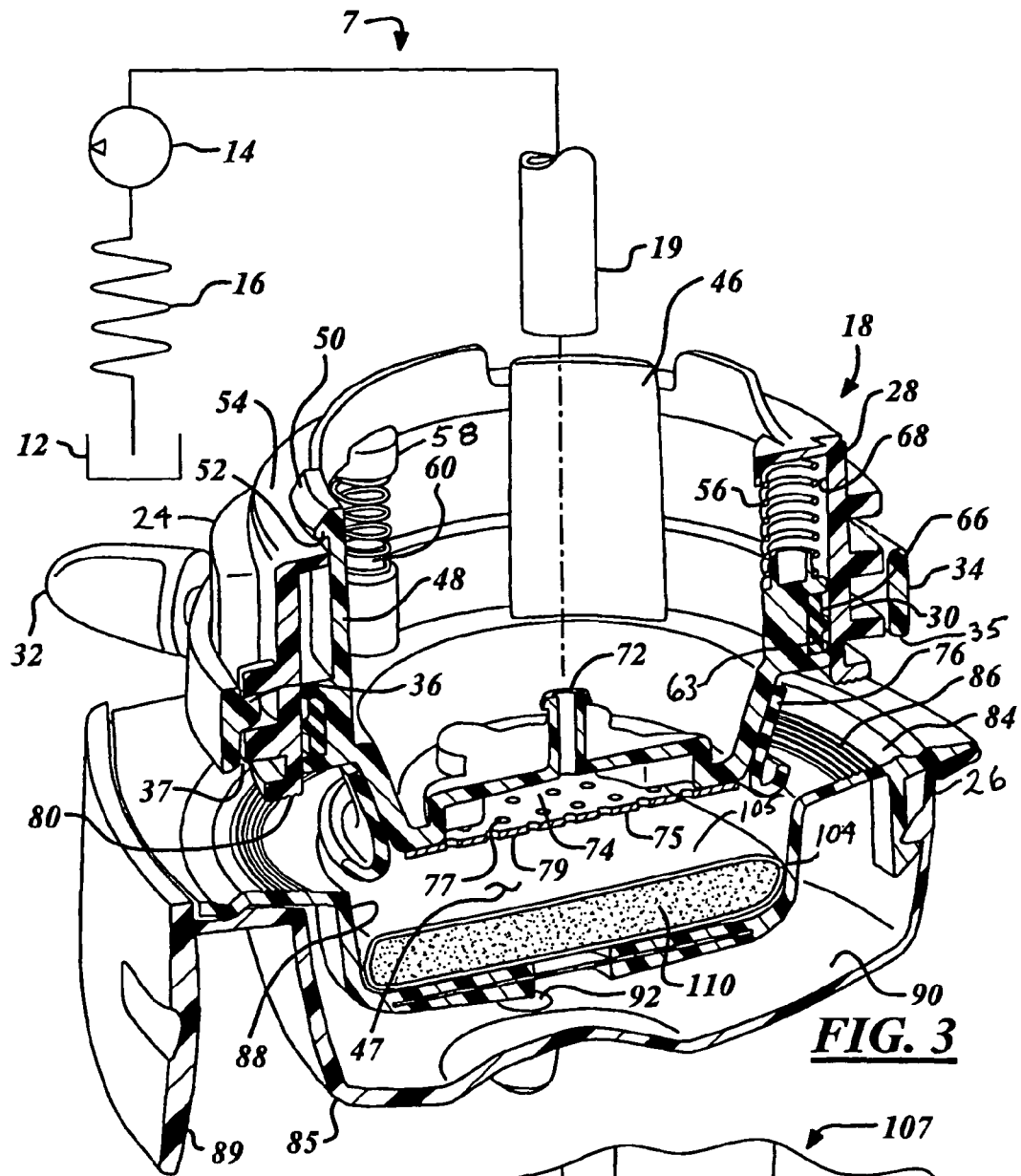
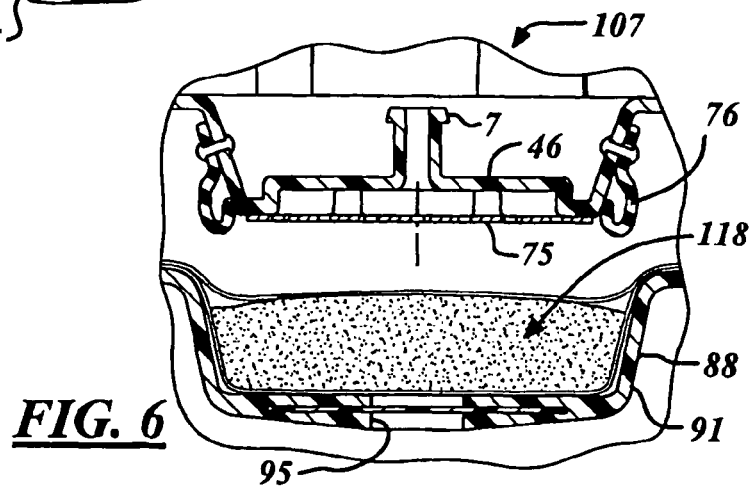
FIG. 3
FIG. 6

BEVERAGE BREWER

FIELD OF THE INVENTION

The present invention relates to beverage brewers, especially coffee brewers used in homes or for preparing small servings of coffee.

BACKGROUND OF THE INVENTION

In recent years, individual servings of flavored and unflavored coffee drinks have become increasingly popular. Moreover, there has been an increased desire for beverage brewers that can be utilized to prepare small or single servings of coffee in the home, office and restaurants.

SUMMARY OF THE INVENTION

The present invention provides a beverage brewer and a method of using the same that are highly useful in the preparation of small servings of brewed beverages. In a preferred embodiment, the beverage brewer of the present invention has the capacity to brew a beverage from one or more prepackaged pods or from a charge of free-form brewing material captured between upper and lower filter membrane surfaces. The beverage brewer includes a showerhead forming a boundary for a pod chamber, and a pod carrier forming an opposite boundary for the pod chamber. A seal is provided which is connected with the showerhead for sealing the pod chamber between the showerhead and the pod carrier. A main carrier mounting the showerhead is also included.

In one embodiment of the present invention, the showerhead is compliantly mounted with the main carrier. In a complimentary embodiment, the main carrier has a contact surface for urging peripheral surfaces of upper and lower filter membrane surfaces toward the pod carrier and thereby joining the filter membrane surfaces together outboard of the seal to form a pod and to facilitate the removal of the brewing material from the beverage brewer.

Other features of the invention will become more apparent to those skilled in the art as the invention is further revealed in the accompanying drawings and detailed description of the invention.

BRIEF DESCRIPTION OF THE DRAWINGS

FIG. 3 is an enlarged sectional view of the brewhead shown in FIG. 2 taken along a section line 3-3 wherein a prepackaged pod of brewing material is being utilized.

FIGS. 6 and 7 are views similar to those of FIGS. 4 and 5 illustrating an alternate embodiment of a pod chamber seal.

DETAILED DESCRIPTION OF THE INVENTION

Figure 1:
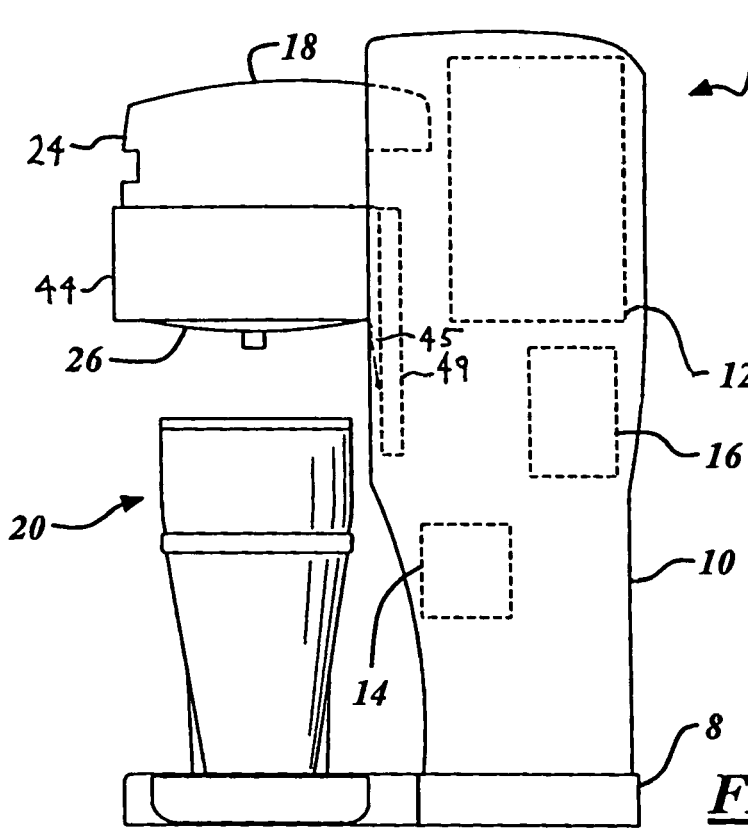
FIG. 1 is a schematic side view of a preferred embodiment beverage brewer of the present invention.
Figure 2:
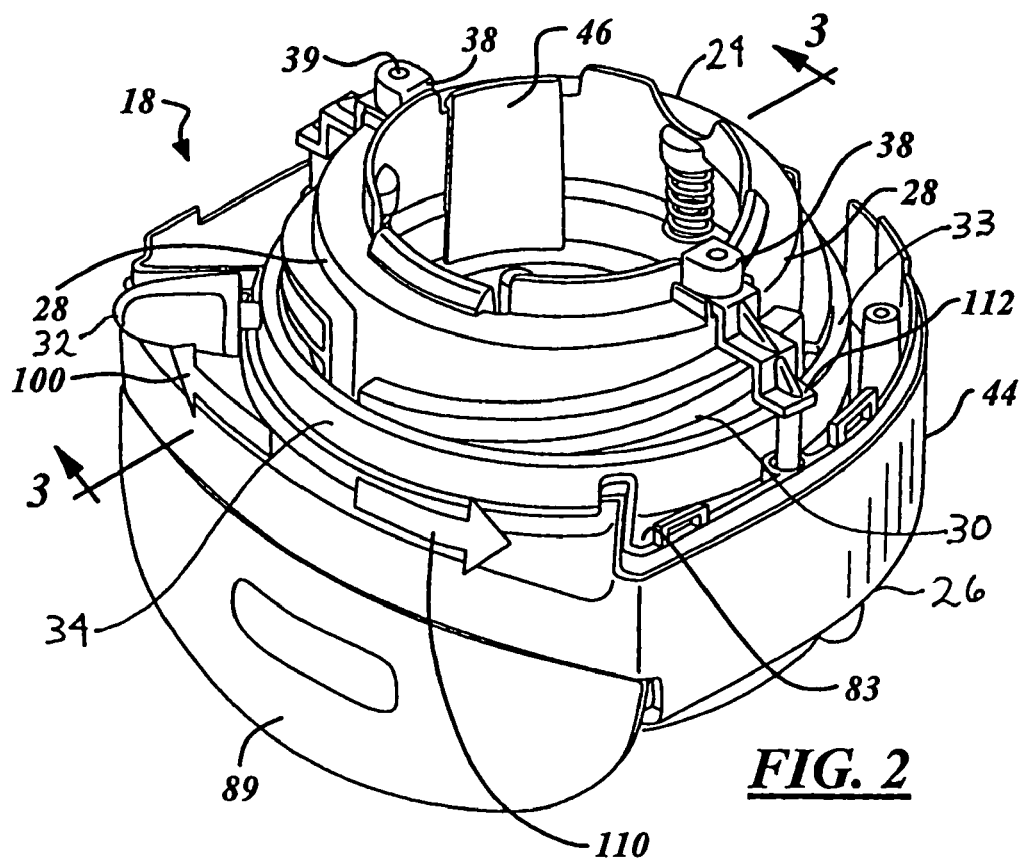
FIG. 2 is an enlarged perspective view of a brewhead portion of the beverage brewer shown in FIG. 1.

Referring to FIGS. 1-3, a beverage brewer 7 is provided with a stand or base 8. Connected to and projecting upwardly from the stand 8 is a tower 10. Positioned inside the tower 10 is a liquid reservoir 12, a heater 16 and a pump 14 which are shown schematically in FIGS. 1 and 3. The tower 10 supports a brewhead 18 in a position to allow it to hang over a beverage container or cup 20. The liquid reservoir 12 is fluidly connected to the heater 16. The pump 14 has a suction end receiving liquid such as water from the heater 16. After leaving the pump 14, pressurized liquid 14 is delivered to the brewhead 18 via a polymeric tubular duct member 19 (FIG. 2). Alternatively, the heater may directly heat the reservoir or heat the liquid downstream of the pump.

Figure 8:
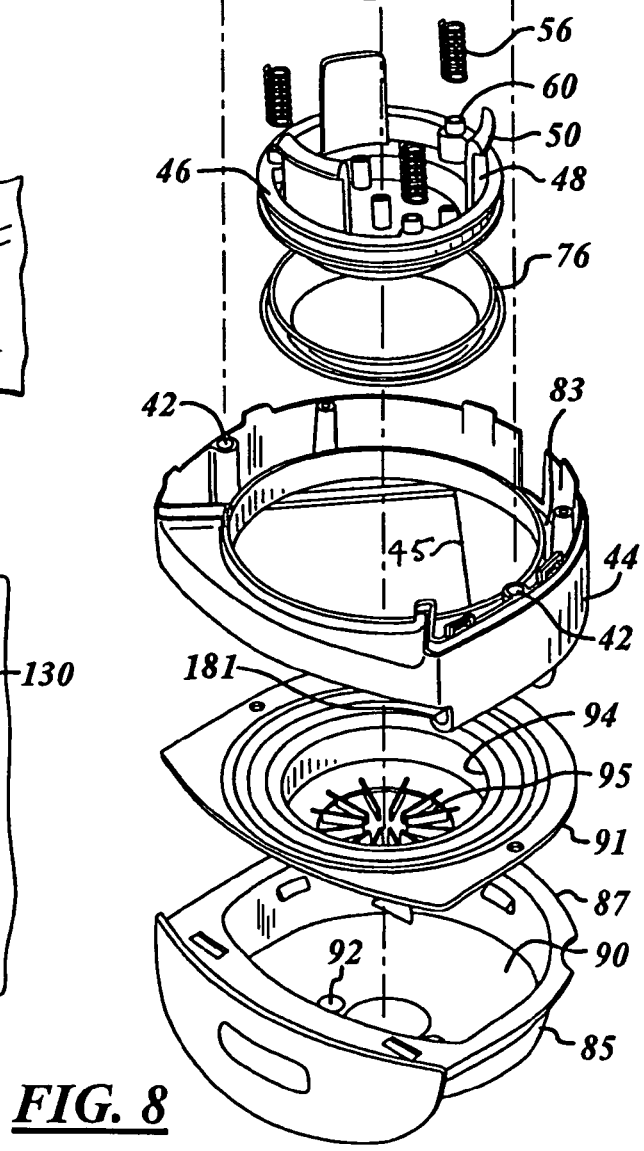
FIG. 8 is an exploded view of the brewhead shown in FIGS. 1-5.

The brewhead 18 includes an upper assembly 24 and a lower assembly 26. The lower assembly 26 includes a drawer 44 having an integral downwardly projecting rear tail 45 (FIGS. 1 and 8). The tail 45 is fixedly connected to a support bracket 49. The support bracket 49 is structurally affixed to the tower 10, thereby connecting the brewhead 18 with the tower 10.

The upper assembly 24 includes a main or inner carrier 28 (FIG. 2). The main carrier 28 on an outer diameter has a spiral groove cam surface 30. The upper assembly 24 also includes a lever 32. The lever 32 is connected with a lever ring 34 that surrounds the main carrier 28. The lever ring 34 has a bottom surface 35 (FIG. 3). Projecting from an inner surface 37 of the lever ring 34 is a pin or rod 36. The rod 36 engages with the cam groove surface 30. Horizontal movement of the lever 32 causes rotation of the lever ring 34 thereby moving the main carrier 28 up and down with respect to the lower assembly 26 due to the engagement of the rod 36 with the spiral cam surface 30.

A series of stepped alignment pins 38 restrain and guide the main carrier 28. The alignment pins 38 have an aperture 39 through which a guide pin (not shown) is connected. The guide pin restrains the main carrier 28 from arcuate or rotational movement. The alignment pins have a stem 40 which is axially fixably received within a respective well 42 (FIGS. 2 and 8) of a drawer cabinet 44 of the lower assembly 26. The alignment pins 38 also limit the upper vertical position of the main carrier 28 with respect to the drawer cabinet 44.

Figure 4:
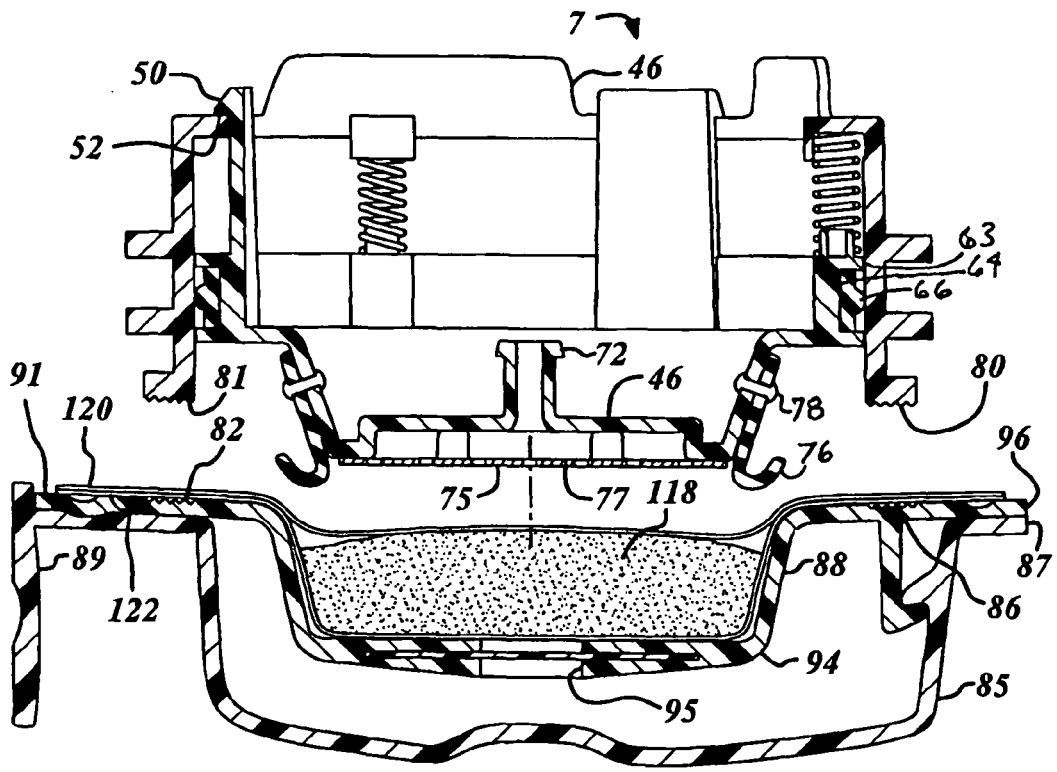
FIGS. 4 and 5 are sectional views of the brewhead shown in FIG. 2 and at various stages of operation wherein a free-form brewing material is being utilized.
Figure 5:
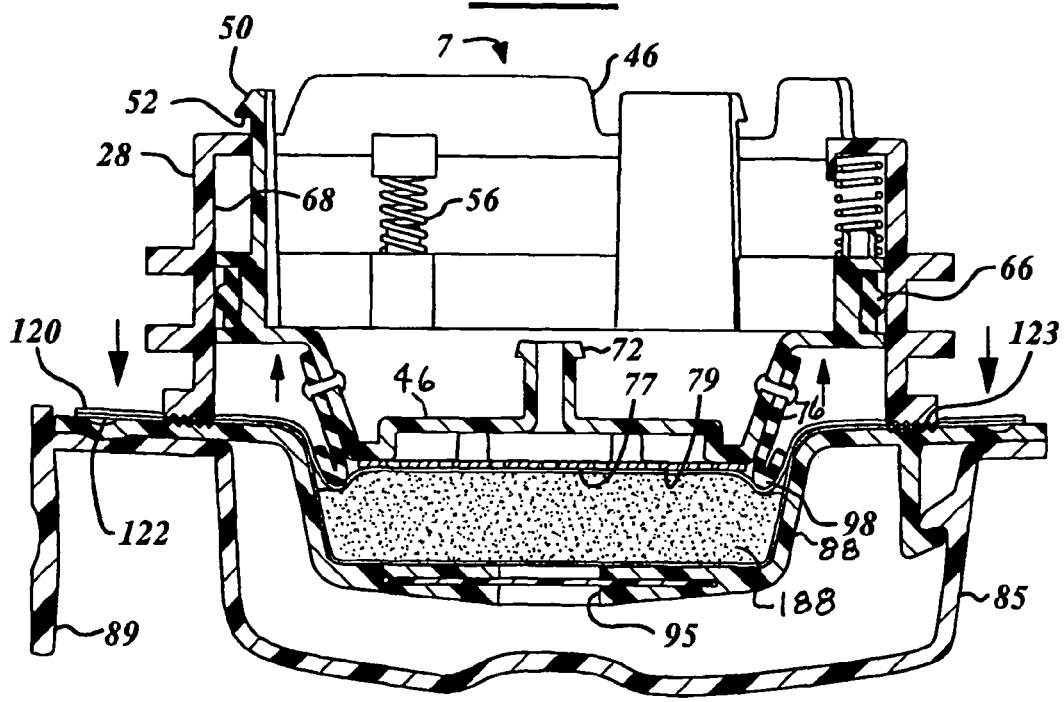

Vertically slideably mounted within an interior of the main carrier 28 is a polymeric molded plastic showerhead 46. Referring to FIGS. 4, 5, and 8, the showerhead 46 has three upward projecting geometrically spaced arms 48 with respective radially outwardly projecting fingers 50. The projecting fingers 50 have an underside 52 (FIG. 3) that makes contact with a top rim 54 of the main carrier 28 to limit the downward movement of the showerhead 46 with respect to the main carrier 28.

For cleaning or maintenance, the arms 48 can be resiliently bent inwardly to allow the showerhead 46 to be removed from the main carrier 28. The showerhead 46 is compliantly downwardly biased and mounted within the main carrier 28 by series of geometrically spaced coil compression springs 56. The top of each spring 56 is captured within a spring mounting chamber 58 of the main carrier 28. The bottom of each spring 56 is mounted on spring towers 60 of the showerhead 46.

The spring constant of the springs 56 can be customized for a beverage that the beverage brewer 7 is making. Typically when brewing regular types of coffee, the springs 56 will have lower spring constants. Brewing espresso type coffees typically requires higher brewing pressures and therefore the springs 56 will have higher spring constants. Of course, other forms of biasing members may be used in place of springs 56, such as elastomeric rods or rubber bellows or diaphragms.

Along an outer surface 63 (FIG. 4), the showerhead 46 has a formed groove 64 for placement of a ring seal 66. The seal 66 annularly seals the showerhead 46 along an inner diameter surface 68 of the main carrier 28.

As seen in FIG. 3, the showerhead 46 has an inlet 72 to receive pressurized fluid delivered by the pump 14 via the tubular duct member 19. The showerhead 46 on its lower surface has a distribution chamber 74 to deliver the pressurized fluid. The distribution chamber 74 has a bottom border formed by a shower plate 75 that has a plurality of small liquid distribution apertures 77 to distribute the pressurized fluid. A lower surface 79 of the shower plate 75 forms an upper boundary for a pod chamber 47.

Figure 7:
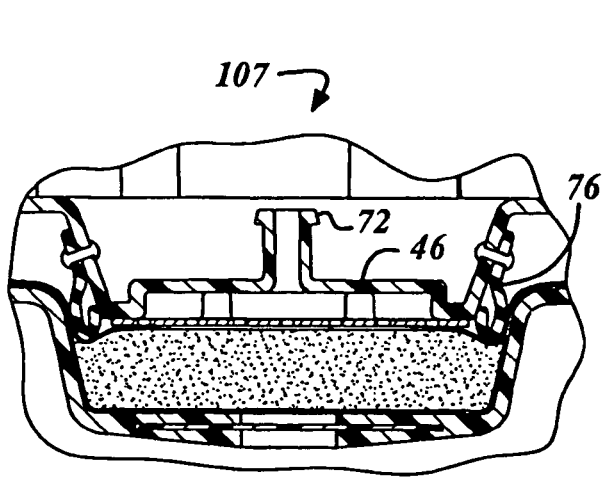

Connected with the showerhead 46 is a chamber seal 76. The chamber seal 76 may be connected by fasteners such as rivets 78 (FIG. 4), or other suitable fasteners or adhesives or by an interference fit. As shown in FIGS. 3-5 and 8, the chamber seal 76 curls resiliently radially outward. In an alternative preferred embodiment 107 of the present invention (FIGS. 6 and 7), the chamber seal 76 curls resiliently radially inwardly. Typically, the seal 76 of FIGS. 6 and 7 will seal with a higher sealing pressure than the seal 76 of FIGS. 4 and 5. The chamber seal 76 is preferably fabricated from a silicone rubber or other suitable material.

As further seen in FIG. 4, a bottom peripheral edge of the main carrier 28 provides a first body annular contact surface 80. The contact surface 80 surrounds the showerhead 46. The contact surface 80 has a series of annular saw tooth serrations 81 and generally surrounds and is radially outward of the seal 76.

As seen in FIG. 8, the lower assembly drawer cabinet 44 has an annular generally horizontal surface 83. The surface 83 functions as a bearing surface supporting the lower surface 35 of the lever ring 34. The drawer cabinet 44 also has two (only one shown) parallel spaced inwardly facing cupped channels or drawer runners 181.

Horizontally slideably mounted to the drawer cabinet 44 is a drawer 85. The drawer 85 is generally bowl shaped having a flanged rim 87 that slides upon the drawer runners 81. A front handle 89 allows the drawer 85 to be pushed in and pulled out of the drawer cabinet 44. A bottom 90 of the drawer has a drip aperture 92.

Snap fitted into a top of the drawer 85 is a pod carrier insert 91. The pod carrier insert 91 has a bowl portion 94 forming a lower boundary of the pod chamber 47 generally opposite the lower surface 77 of the shower plate 75. The bowl portion 94 has a drip aperture 95.

Connected with the bowl portion 94 is a generally horizontal flanged portion 96 (FIG. 4). A slanted side surface 88 of the bowl portion 94 is provided as a valve seat to engage the seal 76 in a manner to be explained later. Generally along a peripheral section of the flanged portion 96 the pod carrier insert 91 has a contact surface 86 for making contact with surface 80 of the main carrier 28. The contact surface 86 has annular saw tooth groove serrations 82.

In operation, the lever 34 is initially actuated to the left (as shown in FIG. 2) and rotated in the direction of arrow 100. The main carrier 28 is thereby raised to a position as shown in FIG. 4. The drawer 85 is pulled out by its handle 89. A single or plurality of prepackaged pods 104 (FIG. 3) containing a brewing material such as coffee, tea, concentrated juice or other beverage can be placed inside the pod carrier insert bowl portion 94. The drawer 85 is then pushed into the drawer cabinet 44. The lever 32 is then actuated in the direction of arrow 110 to cause the main carrier 28 to be displaced downwardly.

The downward movement of the casing 28 will cause the downward movement of the showerhead 46 until the showerhead 46 directly contacts a top 105 (FIG. 3) of the pods or pods 104. The compression springs 56 allow the showerhead's 46 vertical position to resiliently vertically adjust to variations in shapes, sizes, or number of pods placed within the pod carrier insert 91. The reaction force of the compression springs 56 acting to lift the lever ring 34 via the casing 28 is resisted by a lower step 112 (FIG. 2) of the alignment pins 38 acting against a top surface 33 of the lever ring 34.

Regardless of the number of pods 104 placed within the pod chamber 47, the showerhead 46 can directly engage with the top surface of pod(s) 104 and the seal 76 will sealably engage with the slanted surface 88 to seal the pod chamber 47 interface between the showerhead 46 and the pod carrier insert 91.

Heated water or other liquid is then delivered to the showerhead 46 from the tubular duct 19. Because of the contact between the showerhead 46 with the top of the pod(s) 104, the flow of liquid is forced through the interior of the pod(s) 104 instead of around a periphery of the pod(s) 104 within the pod chamber 47. In addition, the springs 56 will ensure the proper compaction of the brewing material within the pod(s) for optimum brewing quality. Accordingly, the pod chamber 47 can be made sufficiently large so that the various sizes, shapes, and numbers of pods 104 can be accommodated without materially affecting brewing quality.

After passing through the pod(s) 104, the brewed beverage then passes out through the drip apertures 92 and 95 then out of the lower assembly 26 into the cup 20. After the brewing process is over, the lever 32 is rotated in the direction of arrow 100 raising the main carrier 28 and showerhead 46. The drawer 85 is then pulled out to allow removal of the pod(s) 104 from the pod carrier insert 91.

Referring to FIGS. 4 and 5 a customized brewing material 118 is provided in a free form. Typically, the free-form brewing material 118 will be provided in a ground, powdered or granulated form.

When the drawer 85 is pulled out, a lower filter membrane 122 is placed in the pod carrier insert bowl portion 94. A supply of free-form brewing material 118 is then placed on the lower filter membrane 122. An upper filter membrane 120 is placed over the free-form brewing material 118 with the free-form brewing material 118 being juxtaposed between upper and lower filter membranes 120,122.

The filter membranes 120,122 are fabricated from filter paper or other suitable filter material and may be disc-shaped, oval, square or any other suitable shape. The drawer 85 is then closed. Actuation of the lever 32, the main carrier 28, and showerhead 46 will be as described previously, with the showerhead 46 making contact with the top of the upper filter membrane 120.

The seal 76 seals the membranes 120 and 122 along a first periphery 98 by contacting the slanted surface 88. Again, the compliant compression spring 56 mounting of the showerhead 46 allows the beverage brewer 7 to accommodate variable volumes of brewing material 118. The springs 56 will ensure the proper compaction of the brewing material 118 within the pod chamber 47 for optimum brewing quality.

Figure 9:
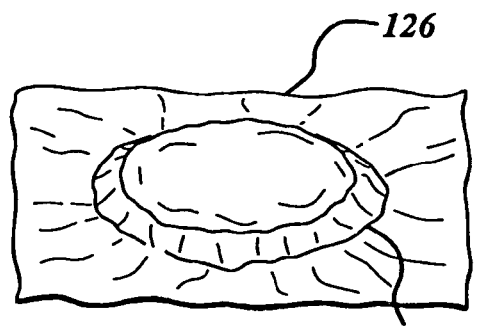
FIG. 9 is a perspective view of a pod formed by the beverage brewer shown in FIG. 1.

Downward movement of the main carrier 28 causes the contact surfaces 80 and 86 to engage. The contact surfaces 80 and 86 capture the filter membranes 120 and 122 and crimp and join the filter membranes 120,122 together along a second periphery 123 (FIGS. 5 and 9). The contact surfaces annular grooved serrations 81 and 82 are aligned peak to valley to aid in the crimping action. A pod 126 is thus created to facilitate an easy, clean, and neat disposal of the brewing material 118.

Figure 10:
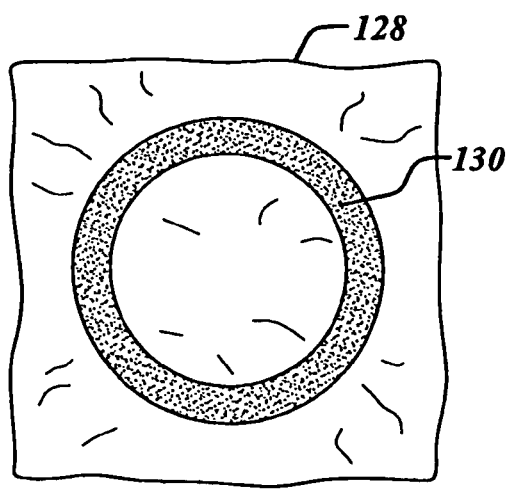
FIG. 10 is a top plan view of a brewing filter paper with a pre-applied adhesive ring that can be utilized with the beverage brewer of the present invention.

Referring to FIG. 10, in an alternative embodiment, a filter membrane 128 is provided with a pre-applied ring 130 of adhesive material. The ring 130 is generally aligned with the location of contact with the surfaces 80 and 86 when the pod chamber 47 is closed. One or both of the filter membranes used with the beverage brewer 7 may optionally have such an adhesive ring 130. The compressive contact of the surfaces 80 and 86 with the upper and lower filter membranes will cause the filter membranes to be joined together by adhesive bonding. Since the location of the adhesive ring 130 is outward of the periphery of sealing (first periphery 98) provided by the seal 76, there is less chance of a bad taste being induced into the brewed beverage since the beverage is sealed from the adhesive ring 130.

In still another embodiment of the present invention, the contact surfaces 80 and/or 86 maybe heated so that the filter membranes may be joined by heat bonding. In such an embodiment, a heat bondable filter membrane material would be utilized on at least one of the filter membranes 120,122. In both the adhesive bonding and heat bonding methods, the serrations 81, 82 on the surfaces 80 and 86 may be modified or eliminated.

While preferred embodiments of the present invention have been disclosed, it is to be understood it has been described by way of example only, and various modifications can be made without departing from the spirit and scope of the invention as it is encompassed in the following claims.

What is claimed is:

1. A beverage brewer for brewing material placed between upper and lower filter membrane surfaces comprising:
   a showerhead forming a boundary for a pod chamber;
   a pod carrier forming a boundary for said pod chamber; and
   a main carrier mounting said showerhead having a contact surface to urge said filter membrane surfaces toward said pod carrier to crimp said filter membrane surfaces together along a periphery thereof,
   wherein said main carrier contact surface is serrated.

2. A beverage brewer as described in claim 1 further including a seal connected with one of said showerhead and said pod carrier for sealing said pod chamber between said showerhead and said pod carrier.

3. A beverage brewer as described in claim 2 wherein said seal is surrounded by said main carrier contact surface.

4. A beverage brewer as described in claim 2 wherein said seal extends radially outwardly.

5. A beverage brewer as described in claim 2 wherein said seal extends radially inwardly.

6. A beverage brewer as described in claim 1 wherein said seal is connected with said showerhead.

7. A beverage brewer as described in claim 1 wherein said pod carrier has a serrated surface.

8. A beverage brewer as described in claim 1 wherein said showerhead is compliantly mounted with respect to said main carrier.

9. A beverage brewer having the capacity to brew a beverage from a free-form brewing material captured between upper and lower filter membrane surfaces, said beverage brewer comprising:
   a showerhead forming a boundary for a pod chamber;
   a pod carrier forming a boundary for said pod chamber;
   a seal connected with one of said showerhead and said pod carrier for sealing said pod chamber between said shower head and said pod carrier; and
   a main carrier mounting said showerhead and having a contact surface for urging said upper and lower filter membrane surfaces toward said pod carrier and thereby joining said filter membrane surfaces together outboard of said seal,
   wherein at least one of said main carrier and said pod chamber is serrated and said filter membrane surfaces are crimped together by said main carrier contact surface.

10. A beverage brewer as described in claim 9 wherein adhesive bonding joins said filter membrane surfaces together.

11. A beverage brewer as described in claim 9 wherein said filter membrane surfaces are joined by heat bonding.

12. A beverage brewer as described in claim 9 wherein said seal is connected with said showerhead.

13. A beverage brewer as described in claim 9 wherein said main carrier contact surface is serrated.

14. A beverage brewer as described in claim 8 wherein said pod carrier has a serrated surface for contacting said filter membranes opposite said main carrier contact surface.

15. A beverage brewer as described in claim 9 wherein said showerhead is compliantly mounted with respect to said first body.

* * * * *